(12) United States Patent
Seo et al.

(10) Patent No.: US 11,109,396 B2
(45) Date of Patent: Aug. 31, 2021

(54) TIME DELAY ADAPTIVE SIGNAL TRANSMISSION/RECEPTION METHOD IN WIRELESS COMMUNICATION SYSTEM AND DEVICE THEREFOR

(71) Applicant: LG ELECTRONICS INC., Seoul (KR)

(72) Inventors: Hanbyul Seo, Seoul (KR); Suckchel Yang, Seoul (KR)

(73) Assignee: LG ELECTRONICS INC, Seoul (KR)

( * ) Notice: Subject to any disclaimer, the term of this patent is extended or adjusted under 35 U.S.C. 154(b) by 0 days.

(21) Appl. No.: 16/723,863

(22) Filed: Dec. 20, 2019

(65) Prior Publication Data

US 2020/0146027 A1    May 7, 2020

Related U.S. Application Data

(63) Continuation of application No. 15/551,259, filed as application No. PCT/KR2016/002251 on Mar. 7, 2016, now Pat. No. 10,536,957.

(Continued)

(51) Int. Cl.
| | |
|---|---|
| *H04W 72/12* | (2009.01) |
| *H04W 56/00* | (2009.01) |
| *H04L 5/00* | (2006.01) |
| *H04W 72/04* | (2009.01) |
| *H04W 88/02* | (2009.01) |

(52) U.S. Cl.
CPC ....... *H04W 72/1242* (2013.01); *H04L 5/0053* (2013.01); *H04L 5/0092* (2013.01); *H04W 56/00* (2013.01); *H04W 72/04* (2013.01); *H04W 88/02* (2013.01)

(58) Field of Classification Search
None
See application file for complete search history.

(56) References Cited

U.S. PATENT DOCUMENTS

| 2008/0276148 A1 | 11/2008 | Lohr et al. |
| 2009/0175245 A1 | 7/2009 | Harada et al. |

(Continued)

FOREIGN PATENT DOCUMENTS

| KR | 1020090094743 | 9/2009 |
| KR | 1020100005720 | 1/2010 |

(Continued)

OTHER PUBLICATIONS

PCT International Application No. PCT/KR2016/002251, Written Opinion of the International Searching Authority dated Jun. 10, 2016, 19 pages.

(Continued)

*Primary Examiner* — Diane L Lo
(74) *Attorney, Agent, or Firm* — Lee, Hong, Degerman, Kang & Waimey

(57) ABSTRACT

The present application provides a method in which a terminal transmits or receives a signal to or from a base station in a wireless communication system. Particularly, the method comprises the steps of: receiving a control signal configured by a first number of time units from the base station; and transmitting or receiving a data signal configured by a second number of time units to or from the base station on the basis of the control signal, wherein the control signal includes an indicator relating to the second number.

8 Claims, 13 Drawing Sheets

Related U.S. Application Data

(60) Provisional application No. 62/129,939, filed on Mar. 8, 2015, provisional application No. 62/173,917, filed on Jun. 10, 2015.

(56) References Cited

U.S. PATENT DOCUMENTS

| | | |
|---|---|---|
| 2011/0164662 A1 | 7/2011 | Kishiyama et al. |
| 2013/0114401 A1 | 5/2013 | Martin et al. |
| 2014/0071954 A1* | 3/2014 | Au .................. H04W 28/0205 370/336 |
| 2014/0293947 A1 | 10/2014 | Nishikawa et al. |
| 2014/0307597 A1 | 10/2014 | Kim et al. |
| 2016/0119948 A1* | 4/2016 | Damnjanovic ....... H04L 5/0094 370/280 |
| 2016/0174238 A1* | 6/2016 | Chen .................... H04L 1/0045 370/336 |
| 2018/0042038 A1 | 2/2018 | Seo et al. |

FOREIGN PATENT DOCUMENTS

| | | |
|---|---|---|
| KR | 1020100024970 | 3/2010 |
| KR | 1020140099227 | 8/2014 |
| WO | 2012093783 | 7/2012 |
| WO | 2013066044 | 5/2013 |
| WO | 2013140355 | 9/2013 |
| WO | 2014208859 | 12/2014 |
| WO | 2017074156 | 5/2017 |

OTHER PUBLICATIONS

U.S. Appl. No. 15/551,259, Office Action dated Apr. 19, 2019, 13 pages.
U.S. Appl. No. 15/551,259, Final Office Action dated Dec. 5, 2018, 9 pages.
U.S. Appl. No. 15/551,259, Office Action dated Jul. 30, 2018, 11 pages.
European Patent Office Application Serial No. 16761956.8, Search Report dated Oct. 1, 2018, 7 pages.

* cited by examiner

FIG. 2
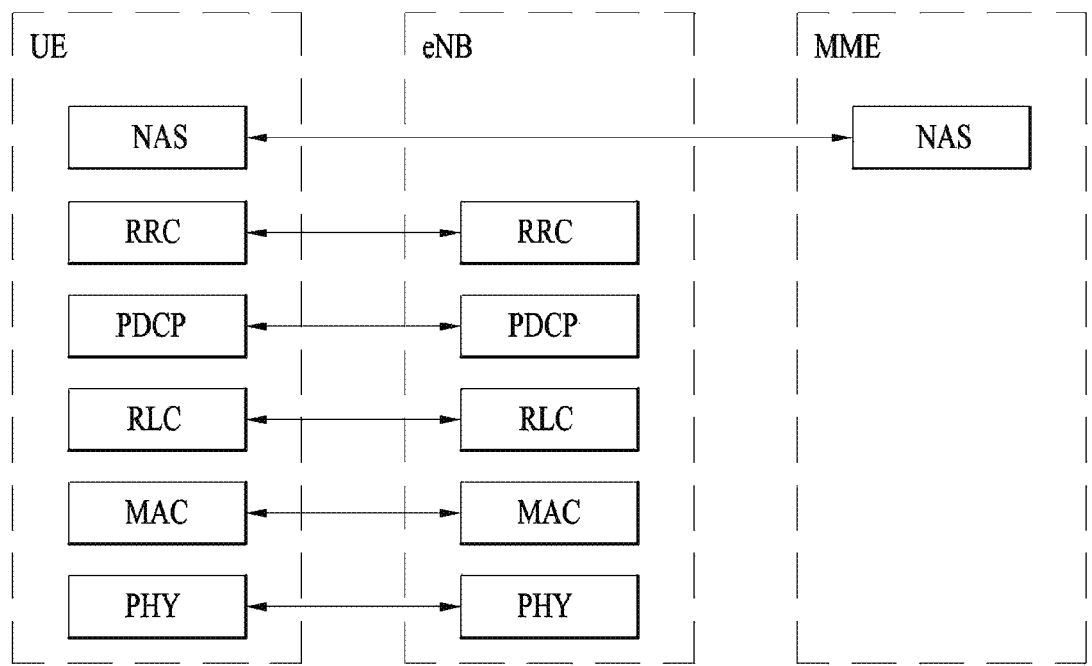
(a) Control-plane protocol stack
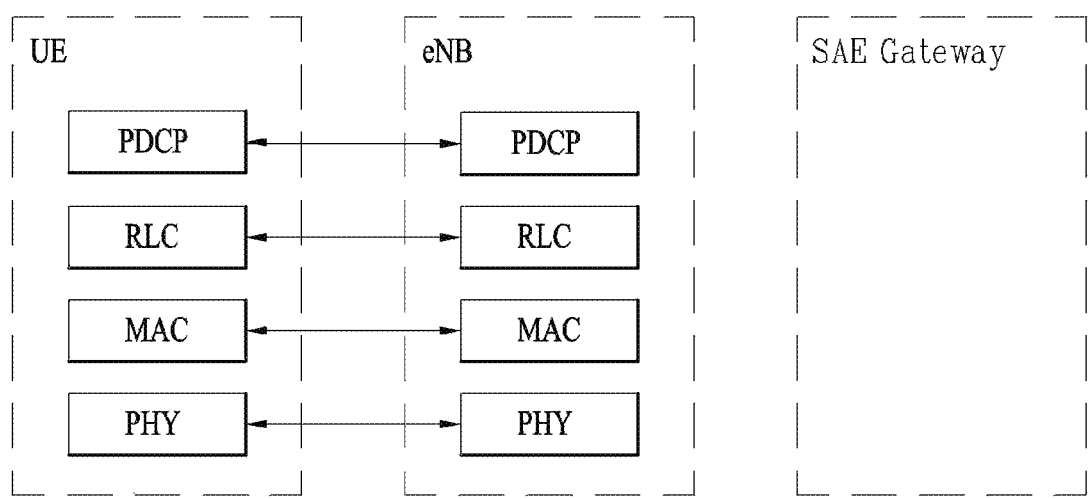
(b) User-plane protocol stack FIG. 5
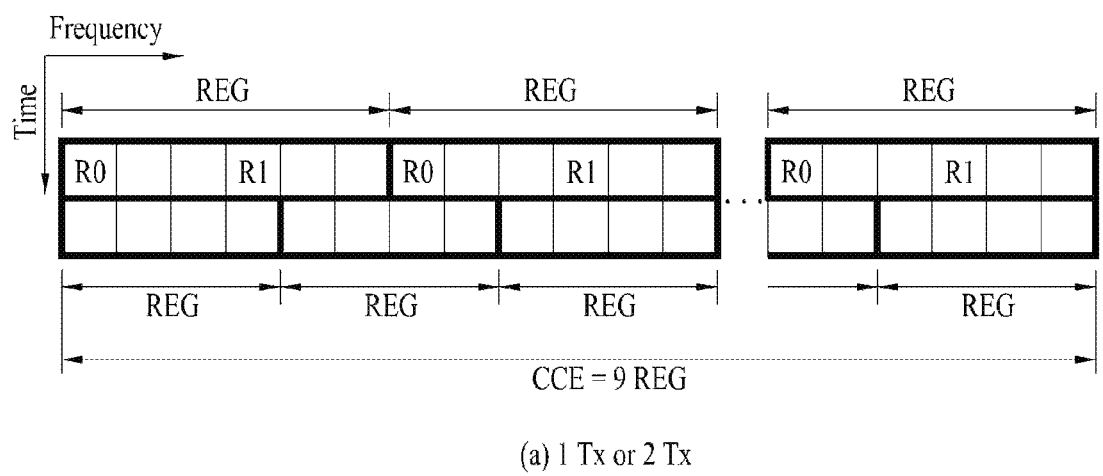
(a) 1 Tx or 2 Tx
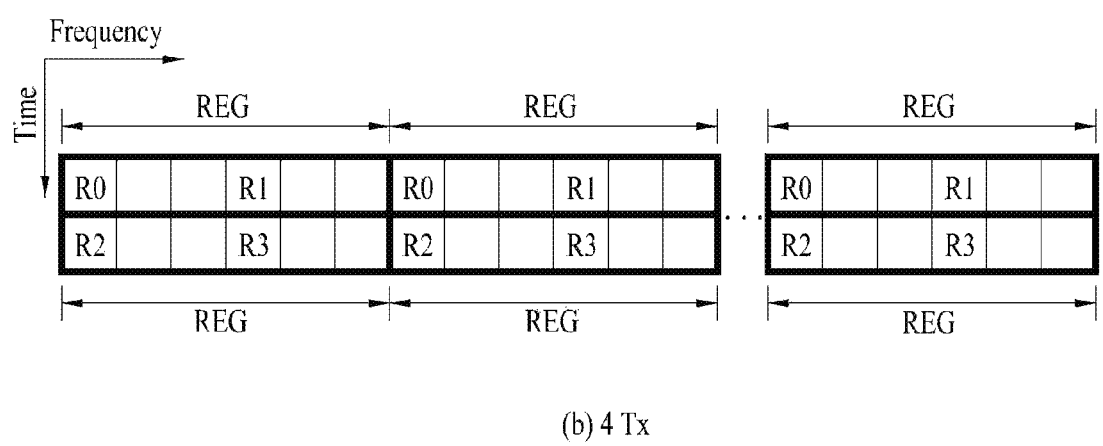
(b) 4 Tx

FIG. 8

| TU size =1 | Candidate | Candidate | Candidate | Candidate | Candidate | Candidate |
|---|---|---|---|---|---|---|
| TU size =2 | Candidate | | Candidate | | Candidate | |
| TU size =4 | Candidate | | | | | |

(a)

| TU size =1 | Candidate | Candidate | Candidate | Candidate | Candidate | Candidate |
|---|---|---|---|---|---|---|
| TU size =2 | Candidate | | Candidate | | Candidate | Candidate |
| TU size =4 | Candidate | | | Candidate | | Candidate |
| | | Candidate | | | Candidate | |
| | | | | | | Candidate |

(b)

FIG. 13
RS symbol
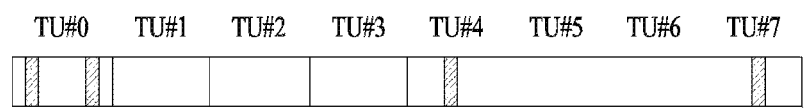
(a)
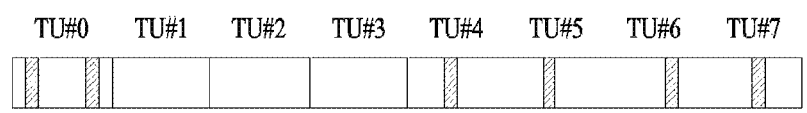
(b)

TIME DELAY ADAPTIVE SIGNAL TRANSMISSION/RECEPTION METHOD IN WIRELESS COMMUNICATION SYSTEM AND DEVICE THEREFOR

This application is a continuation of U.S. patent application Ser. No. 15/551,259, filed on Aug. 15, 2017, now U.S. Pat. No. 10,536,957, which is the National Stage filing under 35 U.S.C. 371 of International Application No. PCT/KR2016/002251, filed on Mar. 7, 2016, which claims the benefit of U.S. Provisional Application No. 62/129,939, filed on Mar. 8, 2015 and 62/173,917, filed Jun. 10, 2015, the contents of which are all hereby incorporated by reference herein in their entirety.

TECHNICAL FIELD

The present invention relates to a wireless communication system, and more particularly, to a method for transmitting and receiving a time-delay adaptive signal in a wireless communication system and device therefor.

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously for broadcast service, multicast service, and/or unicast service.

A single eNB manages one or more cells. A cell is set to operate in one of the bandwidths of 1.44, 3, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency region in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency region in which the UE can transmit data, a coding scheme, a data size, HARQ information, etc. by transmitting UL scheduling information to the UE. An interface for transmitting user traffic or control traffic may be used between eNBs. A Core Network (CN) may include an AG and a network node for user registration of UEs. The AG manages UE mobility on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, new technological evolution is required to achieve future competitiveness. Specifically, cost reduction per bit, increased service availability, flexible use of frequency bands, simplified structure, an open interface, appropriate power consumption of UEs, etc. are required.

DISCLOSURE OF THE INVENTION

Technical Task

Based on the above-discussion, a method for transmitting and receiving a time-delay adaptive signal in a wireless communication system and device therefor are proposed.

Technical Solutions

In an aspect of the present invention, provided herein is a method for transmitting and receiving signals to and from an evolved node B (eNB) by a user equipment (UE) in a wireless communication system, including: receiving a control signal configured with a first number of time units from the eNB; and transmitting or receiving a data signal configured with a second number of time units to or from the eNB based on the control signal. In this case, the control signal may include an indicator for the second number.

In another aspect of the present invention, provided herein is a user equipment (UE) in a wireless communication system, including: a wireless communication module for transmitting and receiving signals to and from an evolved node B (eNB); and a processor for processing the signals. In this case, the processor may be configured to control the wireless communication module to transmit or receive a data signal configured with a second number of time units to or from the eNB based on a control signal configured with a first number of time units, which is received from the eNB. In addition, the control signal may include an indicator for the second number.

In these aspects, the second number may be determined by a combination of the first number and a value indicated by the indicator.

Preferably, the UE may transmit a response signal configured with a third number of time units to the eNB in response to the data signal received from the eNB. In this case, an interval between a reception time of the data signal and a transmission time of the response signal may be determined based on at least one of the first and second numbers.

More preferably, the third number may be determined based on the at least one of the first and second numbers.

Meanwhile, the second number may be determined based on latency required for the data signal.

Additionally, if the second number is plural, reference signals for a data channel may be transmitted in first and last time units of the second number of the time units.

Advantageous Effects

According to embodiments of the present invention, in a wireless communication system, transmitting and receiving ends can exchange control and data signals in an adaptive manner in consideration of latency requirements of data.

The effects of the present invention are not limited to the above-described effects and other effects which are not described herein will become apparent to those skilled in the art from the following description.

DESCRIPTION OF DRAWINGS

FIG. 2 illustrates a control-plane protocol stack and a user-plane protocol stack in a radio interface protocol architecture conforming to a 3GPP radio access network standard between a UE and an E-UTRAN;

FIG. 5 illustrates resource units used to configure a downlink control channel in LTE;

FIG. 8 illustrates candidate configurations for receiving control signals based on different transmission unit sizes according to an embodiment of the present invention;

FIG. 13 illustrates an example in which reference signal (RS) overhead is changed depending on the number of TUs according to an embodiment of the present invention.

BEST MODE FOR INVENTION

Figure 1:
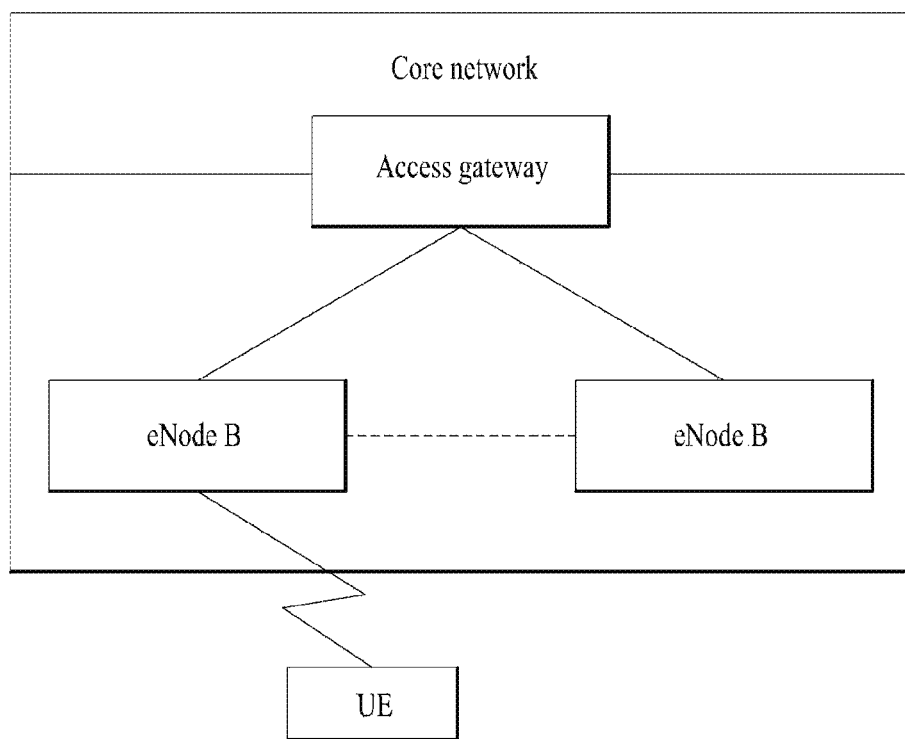
FIG. 1 illustrates a configuration of an E-UMTS network as an example of a wireless communication system.

The configuration, operation, and other features of the present invention will readily be understood with embodiments of the present invention described with reference to the attached drawings. Embodiments of the present invention as set forth herein are examples in which the technical features of the present invention are applied to 3GPP.

While embodiments of the present invention are described in the context of LTE and LTE-A, these embodiments are purely exemplary. Therefore, the embodiments of the present invention are applicable to any other communication system as long as the above definitions are valid for the communication system. In addition, while the embodiments of the present invention are described in the context of Frequency Division Duplexing (FDD), they are also readily applicable to Half-FDD (H-FDD) or Time Division Duplexing (TDD) with some modifications.

FIG. 2 illustrates control-plane and user-plane protocol stacks in a radio interface protocol architecture conforming to a 3GPP wireless access network standard between a UE and an E-UTRAN. The control plane is a path along which the UE and the E-UTRAN transmit control messages to manage calls, and the user plane is a path along which data generated from an application layer, for example, voice data or Internet packet data is transmitted.

A physical (PHY) layer at Layer 1 (L1) provides information transfer service to a higher layer using physical channels. The PHY layer is connected to a medium access control (MAC) layer, which is a higher layer, via transport channels (transantenna port channels). The transport channels deliver data between the MAC layer and the PHY layer. Data is transmitted on physical channels between the PHY layers of a transmitter and a receiver. The physical channels use time and frequency as radio resources. Specifically, the physical channels are modulated using Orthogonal Frequency Division Multiple Access (OFDMA) for downlink and using Single Carrier Frequency Division Multiple Access (SC-FDMA) for uplink.

The MAC layer at Layer 2 (L2) provides service to a higher layer, i.e. a Radio Link Control (RLC) layer, via logical channels. The RLC layer at L2 supports reliable data transmission. RLC functionality may be implemented in a functional block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. An RB refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

A cell constituting an eNB is set to one of the bandwidths of 1.44, 3, 5, 10, 15 and 20 Mhz and provides DL or UL transmission service to a plurality of UEs in the bandwidth. Different cells may be configured so as to provide different bandwidths.

DL transport channels used to deliver data from the network to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
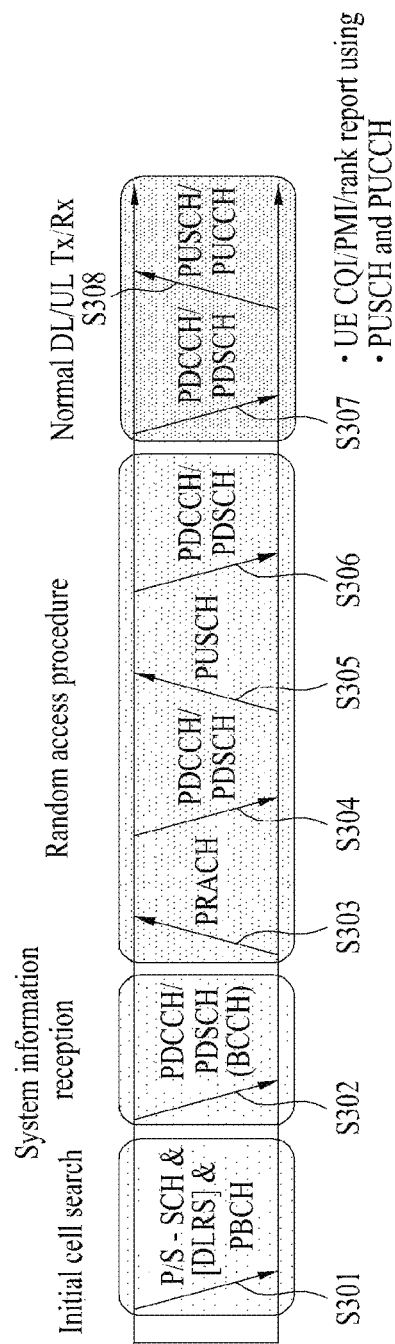
FIG. 3 illustrates physical channels used in a 3GPP system and a general signal transmission method using the physical channels.

FIG. 3 illustrates physical channels used in 3GPP and a general method for transmitting signals on the physical channels.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During initial cell search, the UE may monitor a DL channel state by receiving a DownLink Reference Signal (DL RS).

After initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on UL or receives from the eNB on DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In 3GPP LTE, the UE may transmit control information such as a CQI, a PMI, an RI, etc. on a PUSCH and/or a PUCCH.

Figure 4:
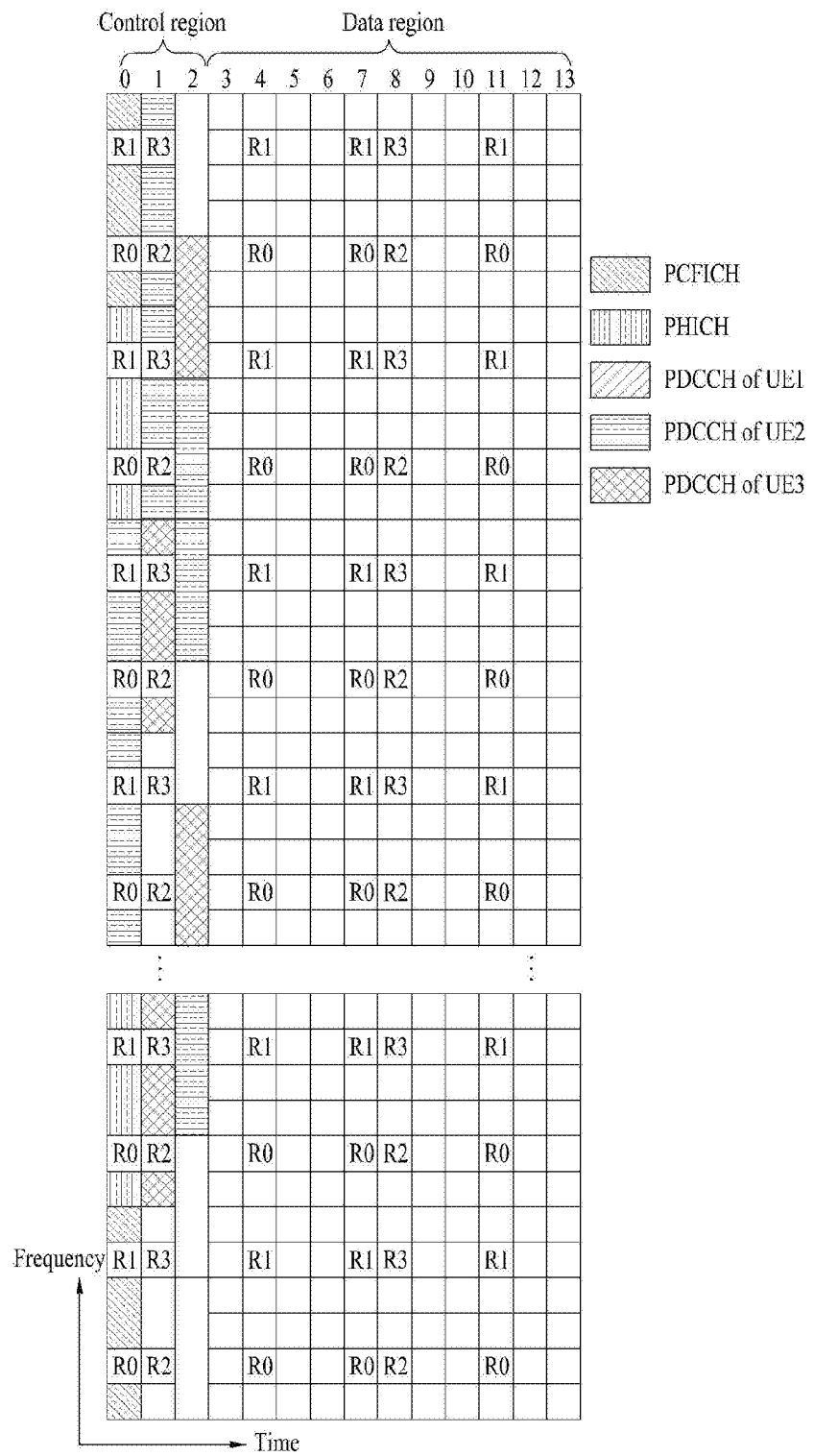
FIG. 4 illustrates a structure of a downlink radio frame used in LTE.

FIG. 4 illustrates control channels included in the control region of a subframe in a downlink radio frame.

Referring to FIG. 4, a subframe includes 14 OFDM symbols. A control region occupies the first one to three OFDM symbols and a data region occupies the other 13 to 11 OFDM symbols in the subframe according to the configuration of the subframe. In FIG. 4, reference characters R1 to R4 denote Reference Signals (RSs) or pilot signals for antenna 0 to antenna 3. RSs are transmitted in a predetermined pattern within a subframe irrespective of the control region and the data region of the subframe. Control channels are allocated to resources unused for RSs in the control region, and traffic channels are allocated to resources unused for RSs in the data region. The control channels of the control region are a Physical Control Format Indicator Channel (PCFICH), a Physical Hybrid-ARQ Indicator Channel (PHICH), a Physical Downlink Control Channel (PDCCH), etc.

The PCFICH indicates the number of OFDM symbols used for PDCCHs in every subframe to UEs. The PCFICH is located in the first OFDM symbol and configured with priority over the PHICH and the PDCCHs. The PCFICH includes four Resource Element Groups (REGs), each REG being distributed across the control region based on a cell Identity (ID). One REG has four REs. An RE is a minimum physical resource defined as one subcarrier by one OFDM symbol. A PCFICH value, which is modulated using Quadrature Phase Shift Keying (QPSK), ranges from 1 to 3 or from 2 to 4 according to a bandwidth.

The PHICH carries HARQ ACK/NACK for uplink transmission. That is, the PHICH is a channel used to deliver HARQ ACK/NACK for uplink HARQ. The PHICH includes one REG and is scrambled cell-specifically. The ACK/NACK is indicated in one bit and modulated using Binary Phase Shift Keying (BPSK). The modulated ACK/NACK is spread with a Spreading Factor (SF) of 2 or 4. A plurality of PHICHs is mapped to the same resources form a PHICH group. The number of PHICHs multiplexed into a PHICH group is determined according to the number of spreading codes. The same PHICH (group) occurs three times to achieve a diversity gain in the frequency and/or time domain.

A PDCCH is allocated to the first n OFDM symbols of a subframe. Here, n is 1 or a larger integer indicated by the PCFICH. The PDCCH includes one or more Control Channel Elements (CCEs). The PDCCH is used to inform a UE or a UE group of the resource allocation of transport channels, namely a PCH and a DownLink SCH (DL-SCH), an uplink scheduling grant, and HARQ information. The PCH and the DL-SCH are transmitted on a PDSCH. Therefore, the eNB and the UE transmit and receive data on a PDSCH except for particular control information or service data.

Information about the destination (one or more UEs) of data of a PDSCH and information about how the UEs should receive and decode the PDSCH data is delivered on a PDCCH. For example, if the Cyclic Redundancy Check (CRC) of a particular PDCCH is masked by Radio Network Temporary Identity (RNTI) "A" and information about data transmitted in radio resources "B" (e.g. a frequency position) with DCI format "C" being a transport format (e.g. a Transport Block (TB) size, a modulation scheme, coding information, etc.) is transmitted in a particular subframe, then UEs within the cell of the eNB monitor the PDCCH using their RNTI information. If one or more UEs have RNTI "A", then the UEs receive the PDCCH and receive a PDSCH indicated by "B" and "C" based on the received information of the PDCCH.

FIG. 5 illustrates resource units used to configure a downlink control channel in LTE. FIG. 5(a) shows a case in which the number of transmit (Tx) antennas is 1 or 2 and FIG. 5(b) shows a case in which the number of Tx antenna is 4. Although a different RS pattern is used according to the number of Tx antennas, REs are configured for a DL control channel in the same manner.

Referring to FIG. 5, a basic resource unit of a DL control channel is an REG. The REG includes four contiguous REs except for REs carrying RSs. REGs are marked with bold lines in FIG. 5. A PCFICH and a PHICH include 4 REGs and 3 REGs, respectively. A PDCCH is configured in units of a control channel element (CCE), each CCE including 9 REGs.

To determine whether a PDCCH including L CCEs is transmitted to a UE, the UE is configured to monitor M(L) (≥L) CCEs that are arranged contiguously or according to a predetermined rule. L that the UE should consider for PDCCH reception may be a plural value. CCE sets that the UE should monitor to receive a PDCCH are referred to as a search space. For example, LTE defines search spaces as illustrated in Table 1.

TABLE 1

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

In Table 1, L is a CCE aggregation level, that is, the number of CCEs in a PDCCH, Sk(L) is a search space with CCE aggregation level L, and M(L) is the number of candidate PDCCHs to be monitored in the search space with CCE aggregation level L.

Search spaces are classified into a UE-specific search space accessible only by a specific UE and a common search space accessible by all UEs within a cell. A UE monitors common search spaces with CCE aggregation levels 4 and 8 and UE-specific search spaces with CCE aggregation levels 1, 2, 4, and 8. A common search space and a UE-specific search space may overlap each other.

For each CCE aggregation level, the position of the first CCE (a CCE having the smallest index) of a PDCCH search space allocated to a UE changes every subframe. This is called PDCCH search space hashing.

A CCE may be distributed across a system band. More specifically, a plurality of logically contiguous CCEs may be input to an interleaver and the interleaver may permute the sequence of the input CCEs on an REG basis. Accordingly, the time/frequency resources of one CCE are distributed physically across the total time/frequency region of the control region of a subframe. As a control channel is configured in units of a CCE but interleaved in units of an REG, frequency diversity gain and interference randomization gain may be maximized.

Figure 6:
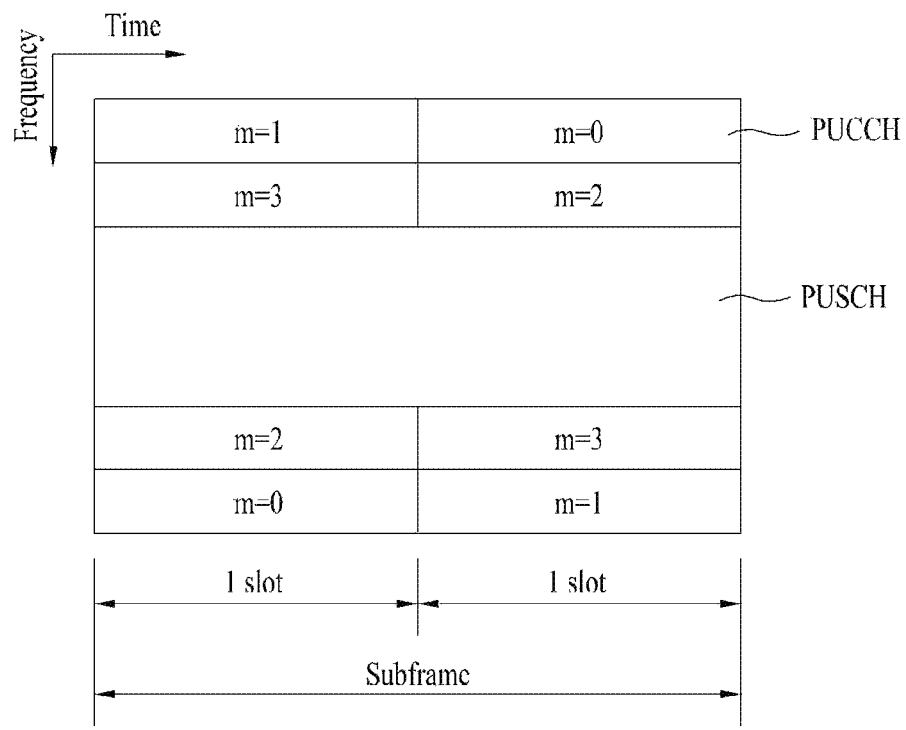
FIG. 6 illustrates a structure of an uplink subframe used in LTE.

FIG. 6 illustrates a structure of a UL subframe in LTE.

Referring to FIG. 6, a UL subframe may be divided into a region to which a physical uplink control channel (PUCCH) carrying control information is allocated and a region to which a physical uplink shared channel (PUSCH) carrying user data is allocated. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for MIMO, and a scheduling request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, m=2, and m=3 are allocated to a subframe in FIG. 6.

Hereinafter, a description will be given of a reference signal (RS).

In general, a reference signal previously known to both transmitting and receiving ends is transmitted along with data from the transmitting end to the receiving end for channel measurement. The reference signal provides a modulation scheme as well as channel measurement so that a demodulation process is performed.

The reference signal is classified into a dedicated RS (DRS) for an eNB and a specific UE, i.e., a UE-specific reference signal and a cell-specific reference signal (CRS) for all UEs in a cell, i.e., a common RS. In addition, the CRS includes a reference signal used for a UE to measure CQI/PMI/RI and report the same to the eNB, which is referred to as a channel state information reference signal (CSI-RS).

Meanwhile, in order for a UE to receive or transmit data from or to an eNB, a certain amount of latency is required. That is, requirements of total latency required for the transmitting end to transmit data to the receiving end are varied depending on data types. For example, when a large file is transmitted, several seconds of latency is not considered as a serious problem in terms of quality experienced by a user. However, in the case of a signal controlling a high-speed vehicle, latency should be within several decades of ms. As a method for reducing latency of wireless data transmission and reception, a transmission time unit for a data signal and control signal therefor can be shortened. Details will be described with reference to the accompanying drawings.

Figure 7:
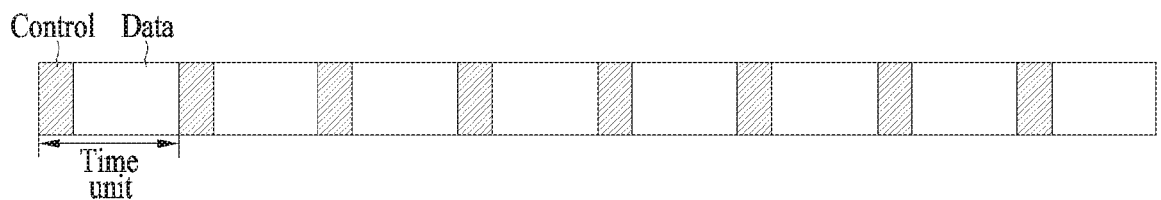
FIG. 7 illustrates a structure for transmitting control and data signals in downlink.

FIG. 7 illustrates a structure for transmitting control and data signals in downlink. Particularly, it is assumed in FIG. 7 that control and data signals are transmitted in a single time unit (TU) basis. That is, a control signal transmitted in a specific TU carries various information on data in the specific TU.

In this structure, if the TU has a short length, not only a time required for transmitting and receiving data but also a time required for performing retransmission in case of failure of transmission and reception are decreased. Moreover, when this structure is used, a time required for performing various control-related processes for a UE is also decreased. Therefore, when low latency data is used, it is desirable to transmit the data and control signal therefor using a short length of TU.

However, in the case of data where high latency is allowed, the short length of TU may degrade efficiency. For example, when a time required for transmitting a control or data signal is relatively long, it is possible to obtain the frequency diversity effect by changing transmission frequency resources during the time. In addition, due to the long transmission time, the impact of an interference signal is randomized. Moreover, since a transmitted RS can be used during a relatively long time period, it is possible to reduce RS overhead. Further, even when there is serious signal attenuation between the UE and eNB, energy necessary for successful control signal reception can be sufficiently transferred because transmission is also performed during the relatively long time period.

By modifying the structure of FIG. 7, it is possible to create a structure where a control signal occupies the entirety of the TU or a structure where frequency resources for transmitting the control signal is limited to a partial region. In this case, the frequency diversity effect can be acquired by changing the frequency resources for control signal transmission according to the TU.

As described above, a communication scheme of adjusting a transmission time unit according to latency required for data transfer can be efficiently used. Particularly, considering that in the case of low latency data, the data should be transmitted immediately after generation, adjustment of the transmission time unit should also be performed dynamically to maximize the efficiency. Hence, the present invention proposes a method for dynamically adjusting a transmission time unit in an adaptive manner by considering latency of data.

First, a plurality of transmission units are defined for a downlink control signal between the eNB and UE instead of using a single transmission unit. Thereafter, the UE assumes that the plurality of transmission units are used for the downlink control signal and then attempts detection of its control signals in terms of all of the assumed transmission units. This may imply that when the structure shown in FIG. 7 is applied, the eNB can not only transmit a control signal configured with a single TU to the UE but also configure a control signal transmitted with multiple TUs.

FIG. 8 illustrates candidate configurations for receiving control signals based on different transmission unit sizes according to an embodiment of the present invention.

Referring to FIG. 8, a UE configures resource candidates with TU sizes of 1, 2, and 4 for a control signal and then attempts to detect the control signal transmitted to the corresponding UE in each candidate position. Thus, an eNB can transmit, to the UE, data requiring low latency using a control signal configured with a single TU at any time and if necessary, the eNB can transmit data where high latency is allowed using a control signal configured with two or four TUs more efficiently.

Referring to the example of FIG. 8 (a), although there may be one candidate with a specific TU size at a specific time, a plurality of candidates may be defined within acceptable blind decoding complexity of the UE. Thus, it is possible to extend the range of control signal resources that can be used by the eNB for transmission. Particularly, by defining the amount of time/frequency resources occupied by a plurality of candidates having the same TU size in various ways, even for data requiring the same latency, a control signal can be transmitted by using a proper amount of resources depending on the link status of the UE at a corresponding time. FIG. 8 (b) shows the example of adding candidate positions to allow candidates using a plurality of TUs to initiate transmission in every TU.

In the case of a candidate using a plurality of TUs, non-consecutive TUs can be used instead of consecutive TUs by modifying the example of FIG. 8. In this case, although latency may be increased, the diversity effect can be improved in the time domain.

Figure 9:
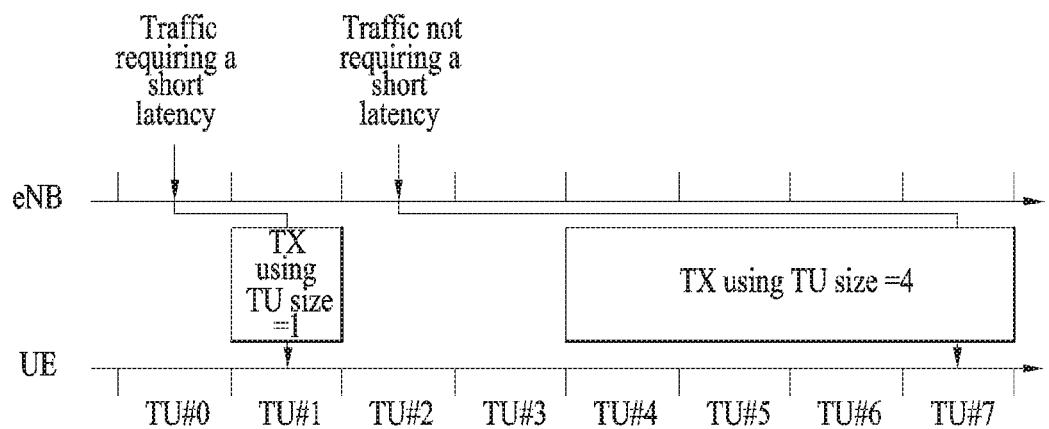
FIG. 9 illustrates an example in which an eNB schedules data reception for a UE according to an embodiment of the present invention.

FIG. 9 illustrates an example in which an eNB schedules data reception for a UE according to an embodiment of the present invention. In particular, it is assumed in FIG. 9 that the structure shown in FIG. 8 is used.

Referring to FIG. 9, when traffic requiring low latency occurs in TU #0, the eNB immediately transmits data in TU #1 using one of candidates that occupy a single TU with low latency. Meanwhile, when data that can tolerate high latency occurs in TU #2, the eNB determines to use a control signal candidate using 4 TUs and then transmit a control signal to the UE using TU #4, TU #5, TU #6, and TU #7 together after waiting until TU #4 where the corresponding candidate is initiated.

It is optimal to allow simultaneous transmission of candidates with different numbers of TUs to dynamically change the number of TUs of a control signal, but it may increase complexity of UE's blind decoding operation with respect to the control signal.

Specifically, assume that the eNB simultaneously transmits a control signal using a single TU to a UE in TU #0 and a control signal using TU #0 and TU #1 to the corresponding same UE based on the structure show in FIG. 8. In this case, to distinguish between two control signals, time/frequency resources for the control signal using the single TU should be different from those for the control signal using the two TUs in TU #0. That, in TU #0, the UE needs to monitor candidates of the control signals, which are transmitted using different numbers of TUs, using two types of resource sets. This may imply that on a search space formed in a specific TU, time/frequency resource sets occupied by a specific candidate are determined according to a TU size of the corresponding candidate. As a result of this, the number of total candidates monitored by a UE may be increased.

Figure 10:
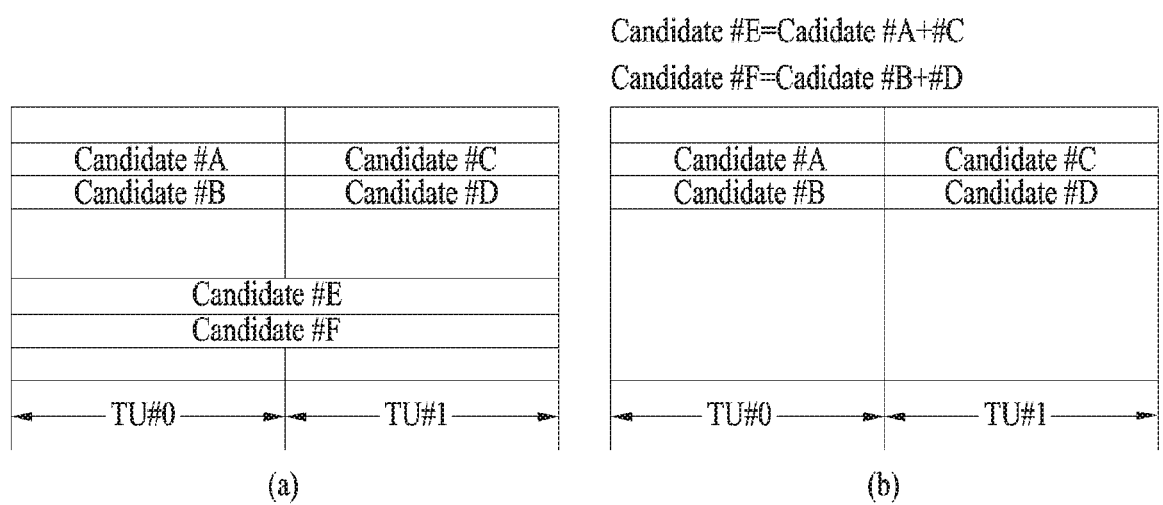
FIG. 10 illustrates an example of configuring positions of candidates in time and frequency domains in a different way according to an embodiment of the present invention.

FIG. 10 illustrates an example of configuring positions of candidates in time and frequency domains in a different way according to an embodiment of the present invention.

It can be seen from FIG. 10 (a) that there is a total of six candidates: candidates #A and #B using TU #0 only; candidates #C and #D using TU #1 only; and candidates #E and #F using TUs #0 and #1. In this case, time/frequency-domain positions of candidates in the same TU need to be different from each other for the aforementioned operation. That is, to reduce the complexity, candidates may be configured to have the same resources in a specific TU regardless of the number of TUs used for configuring resources of the candidates as shown in FIG. 10 (b). Particularly, referring to FIG. 10 (b), the candidate #E is configured to use the resources used by the candidates #A and #C.

Meanwhile, even though control channels with different numbers of TUs can be simultaneously transmitted at a specific time, there may be limitations. For example, a case in which transmission of control channels with different numbers of TUs is terminated in the same TU may be restricted. By doing so, it is possible to prevent the following problem. That is, in case various data transmission and reception operations are regulated with reference to the end of a control channel, if two control channels are terminated at the same time, there may be the problem that which control channel becomes reference for the data transmission and reception operation.

The above regulations can be subdivided such that the limitation is applied to either a control signal for downlink data or a control signal for uplink data. Alternatively, priority can be determined. For example, when two control signals with different numbers of TUs are terminated at the same time, only a control signal using a smaller number of TUs may be considered to be valid. Thus, if low latency data occurs while the eNB transmits a high latency control signal using a number of TUs, the eNB can transmit the low latency data. Of course, priority can be given to a signal using more TUs so that consumption of more resources may be considered to be valid.

If there are a plurality of channels with different numbers of occupied TUs at the same time, the operation of giving priority to a channel using more TUs (or fewer TUs) can be extensively applied to a general case. Hereinafter, a description will be made on the assumption that a channel using fewer TUs has priority. When a plurality of channels with different numbers of TUs are present at the same time, the different channels may occupy different frequency resources on the same carrier or appear on different carriers.

(A) From the perspective of a single UE, there may be downlink data and/or control channels with different numbers of TUs at the same time. For example, while the UE receives a first downlink channel transmitted in TU #n, TU #n+1, . . . , TU #n+k, a second downlink channel transmitted in TU #n+x (where x<k) may be scheduled. In this case, the UE can preferentially receive the second downlink channel by assuming that data and/or a control signal requiring lower latency are transmitted through the second downlink channel.

Preferential reception of a specific downlink channel may be implemented in various ways. For example, a UE may receive only the specific downlink channel and drop reception of other channels which partially overlap with the specific downlink channel in the time domain. As another example, although a UE attempts to receive all channels, the UE may be configured to perform ACK/NACK transmission only for the specific downlink channel if the specific downlink channel is a data channel. As a further example, although a UE attempts to receive all channels, the UE may be configured to preferentially store a soft bit of the specific downlink channel in a soft buffer if the specific downlink channel is a data channel and a decoding error occurs in a plurality of channels.

While receiving a channel with many TUs, the UE should continuously attempt to receive a control channel with few TUs to receive scheduling information on a channel with few TUs. That is, although the UE already receives a downlink data channel from TU #n, the UE should continue to monitor the control channel with few TUs.

(B) From the perspective of a single UE, there may be uplink data and/or control channels with different numbers of TUs at the same time. For example, while the UE transmits a first uplink channel transmitted in TU #n, TU #n+1, . . . , TU #n+k, a second uplink channel transmitted in TU #n+x (where x<k) may be scheduled. In this case, the UE can preferentially transmit the second uplink channel by assuming that data and/or a control signal requiring lower latency are transmitted through the second uplink channel.

Preferential transmission of a specific uplink channel may be implemented in various ways. For example, a UE may transmit only the specific uplink channel and drop transmission of other channels which partially overlap with the specific uplink channel in the time domain. In particular, this operation is suitable for a UE without a capability of simultaneously transmitting a plurality of uplink channels.

As another example, although all channels are transmitted, priority may be given to the specific uplink channel in terms of power allocation. Specifically, if the total power required for a plurality of channels is higher than the maximum power that the UE can generate at the corresponding time, the UE may be configured to first allocate power required for the specific uplink channel and then allocate the remaining power to the remaining channels. In this case, transmit power of a channel using many TUs may be changed. In particular, in the case of quadrature amplitude modulation (QAM) where information is loaded according to a signal size, this may cause malfunction. To prevent the malfunction, a UE may be configured to transmit a channel to be transmitted using a specific number of TUs using the remaining power after allocating the power required for the specific uplink channel by assuming that transmission of the specific uplink channel must occur. Details will be described with reference to the accompanying drawings.

Figure 11:
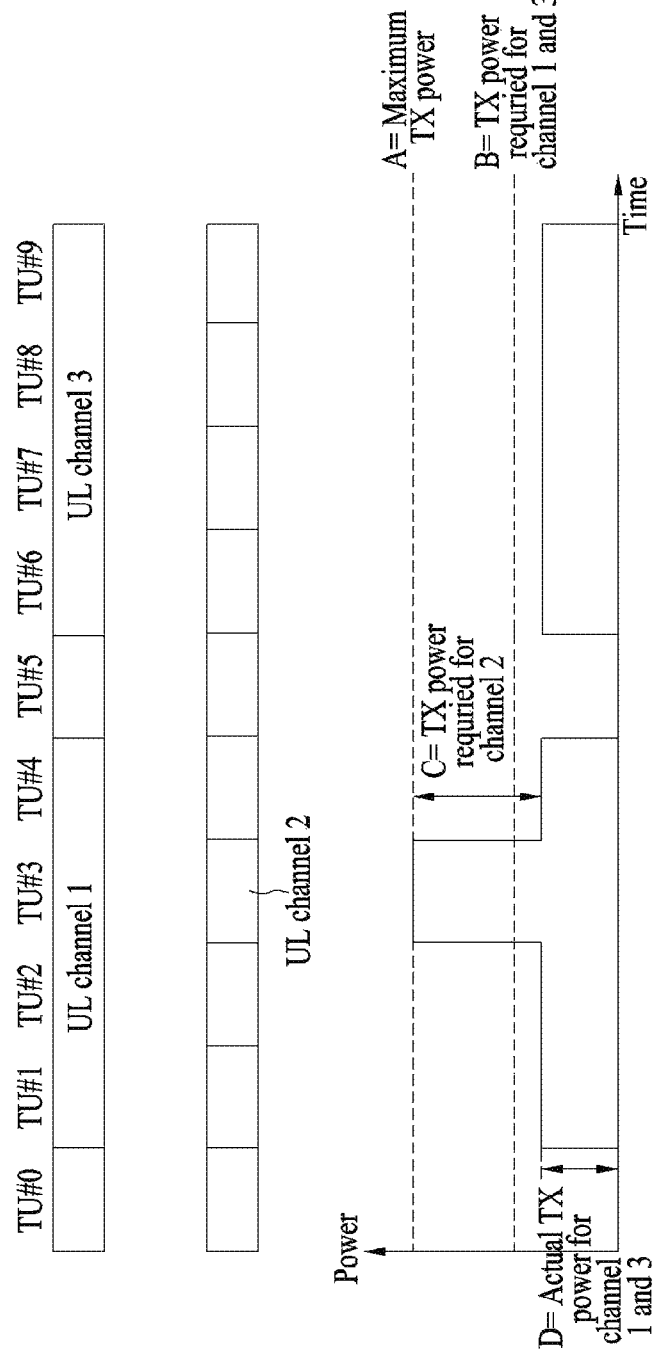
FIG. 11 illustrates an example of allocating uplink power according to an embodiment of the present invention.

FIG. 11 illustrates an example of allocating uplink power according to an embodiment of the present invention. In particular, it is assumed in FIG. 11 that when a UE has the maximum transmit power A, uplink channels 1 and 3 using 4 TUs require transmit power B and uplink channel 2 using 1 TU requires transmit power C.

Referring to FIG. 11, although the UE give priority to the power of the uplink channel 2, the UE transmits the uplink channel 1 at transmit power D to constantly maintain power of other channels. Thus, when the UE needs transmit the uplink channel 2 while transmitting the uplink channel 1, the UE can transmit two channels at the maximum transmit power. However, by doing so, when the uplink channel 3 is independently transmitted, the UE may not generate the power required for the uplink channel 3. The transmit power in the example of FIG. 11 may be not only an absolute value, for example, a certain dBm but also expressed as a proportion to the maximum power, for example, a certain percentage of the maximum power.

(C) In the time division duplex (TDD) system, while a single UE receives a downlink channel with many TUs, the UE may be instructed to perform uplink transmission using few TUs. In this case, the UE may stop receiving the downlink channel with many TUs and perform the uplink transmission using few TUs in order to rapidly transmit low latency data. Similarly, while a UE receive a downlink channel with many TUs, an eNB may transmit control information for changing some time periods to uplink resources. In this case, the UE may be configured to stop receiving the downlink channel with many TUs. On the other hand, while a UE transmits an uplink channel with many TUs, the eNB may transmit control information for changing some time periods to downlink resources. In this case, the UE may be configured to stop transmitting the uplink channel with many TUs.

The aforementioned operation may be applied to a case in which while a UE transmits or receives a channel with many TUs, the eNB instructs the UE to perform operation using few TUs through a separate physical layer control signal. For example, the eNB may indicate the number of TUs constituting a basic time unit to be used during a predetermined time period. If the UE is instructed to perform operation using few TUs while the UE performs operation using many TUs after receiving the instructions therefor, the UE may be placed in the situation. In this case, the UE may be configured to preferentially perform the operation using few TUs.

As described above, the search space for control signals is configured such that various TU sizes are used for transmitting the control signals. In addition, a UE performs blind decoding on the control signals and thus, an eNB can dynamically change the TU sizes. Hereinafter, with reference to embodiments, a description will be given of an operation for transmitting and receiving a data signal when a control signal is transmitted as described above.

1) TU Size Used for Data Transmission and Reception

The TU size used for the data transmission and reception can be indicated through a control signal. For example, the control signal may include an indicator and using this indicator, it can be informed how many TUs are occupied by a corresponding data signal.

Alternatively, the TU size used for the data transmission and reception may be determined from a TU size used for the control signal. This may imply that when an eNB transmits the control signal using many TUs, the corresponding data is allowed to have high latency and thus, the data can be transmitted using many TUs. For example, the number of TUs used for data transmission may be set to be equal to that used for transmitting a control signal for scheduling the data signal. Particularly, downlink data can be regulated to use the same TU set as that used for a downlink control signal for scheduling the downlink data.

In addition, the two methods can be combined with each other. The control signal has a limited number of bits and a combination of the bits is used to indicate a specific number of TUs. In this case, the number of TUs indicated by each bit combination may be determined from the number of TUs used for transmitting the control signal. For example, in case an indicator is configured with 2 bits and a control signal is transmitted using a single TU, {00}{01}, {10}, and {11} may indicate that the numbers of TUs used for data are 1, 2, 3, and 4, respectively. On the other hand, in case a control signal is transmitted using two TUs, {00}, {01}, {10}, and {11} may indicate that the numbers of TUs used for data are 2, 3, 4, and 5, respectively. Further, the eNB may determine the numbers of data TUs indicated by bit combinations included in the indicator through a higher layer signal such as RRC in advance.

When the number of TUs for data transmission and reception is determined, various types of transmission parameters can also be determined. Since an RS needs to be configured in a state that corresponding TUs are bounded to a single transmission unit, the density of the RS can be changed according to the number of transmission TUs. In addition, a transport block (TB) size can also be determined according to the number of transmission TUs.

2) Buffering of Downlink Data

If a UE fails to decode a data signal received from an eNB, the UE stores a part of the received data signal in its buffer and then performs HARQ to be combined with a retransmitted signal. In this case, if the number of TUs used for downlink data is changed as described above, the data received in the buffer needs to be adjusted in an appropriate manner.

For example, when N TUs are used for data, it can be considered that N pieces of data using a single TU is transmitted in parallel. Thus, a UE may be configured to set a storage space when the UE fails to demodulate the data using the N TUs to be larger than that when the UE fails to demodulate the data using the single TU, for example, to store N times more bits in the former storage space. By doing so, the UE can store more bits of the data transmitted using many TUs even when the UE's buffer size is limited and thus, a recovery probability can be improved in the case of retransmission. Accordingly, it is possible to enhance the practical use of the initial transmission where many TUs are used.

3) Relationship with Uplink Transmission

When a UE receives a control signal from an eNB, the UE can transmit an uplink signal based on the received control signal. If downlink data is scheduled by the received control signal, the UE receive the corresponding data and then transmits HARQ-ACK to inform the eNB of success or failure of demodulation. If uplink data is scheduled by the received control signal, the UE transmits uplink data according to the received control signal. In this case, the number of TUs used for transmitting the uplink signal may be determined according to the number of TUs used for the control signal for scheduling (or data signal). To this end, the aforementioned embodiment can be applied in the same manner.

Hereinafter, the HARQ-ACK will be taken as an example. If the eNB schedules downlink data using many TUs, this may imply that high latency is allowed and thus, for the HARQ-ACK, a plurality of TUs may be used to achieve a higher transmission success probability. On the other hand, if the eNB uses few TUs, the number of TUs used for the HARQ-ACK may be decreased to achieve rapid HARQ operation. Meanwhile, if the number of TUs used for a downlink control signal is unrelated to that used for downlink data, the number of TUs for the HARQ-ACK can be determined from that for the downlink data.

In addition, an interval between a reception time of the downlink control signal (or downlink data) and a transmission time of the uplink signal related to the downlink control signal can also be determined according to the number of TUs used for the downlink control signal or downlink data. For example, since data transmitted using many TUs generally includes many bits, it is expected that more time is required for decoding the data. Thus, to guarantee enough time for decoding, it is preferred to increase an interval between a time when the transmission of the downlink control signal or downlink data is terminated and a time when HARQ-ACK transmission is initiated by delaying the HARQ-ACK transmission time. On the contrary, if a control signal or data is transmitted using few TUs, it is desirable to reduce a time required for decoding and rapidly provide feedback to the eNB through the HARQ-ACK. Therefore, it is preferred to reduce the interval between the time when the transmission of the downlink control signal or downlink data is terminated and the time when the HARQ-ACK transmission is initiated.

Figure 12:
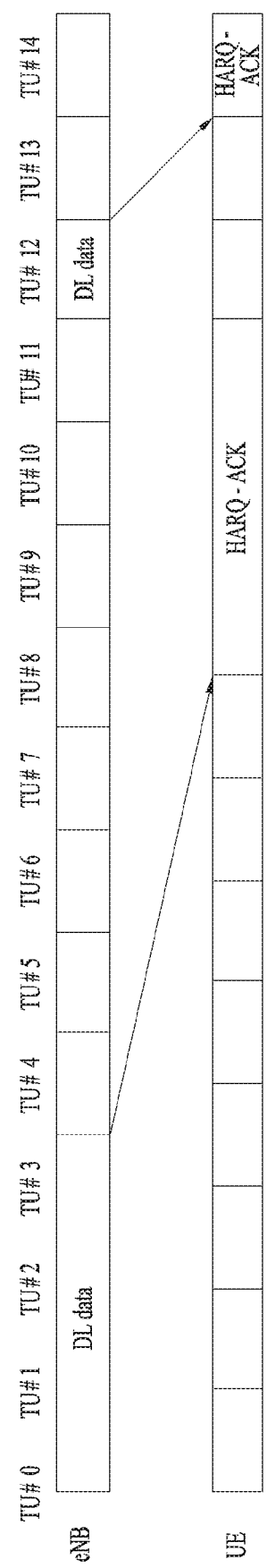
FIG. 12 illustrates an example of determining a transmission time of HARQ-ACK depending on a time unit (TU) size according to an embodiment of the present invention.

FIG. 12 illustrates an example of determining a transmission time of HARQ-ACK depending on a TU size according to an embodiment of the present invention.

Referring to FIG. 12, data transmitted using TU #0 to TU #3 is associated with an HARQ-ACK signal using TU #8 to TU #11 after a processing time of 4 TUs. On the other hand, data transmitted in TU #12 is associated with an HARQ-ACK signal in TU #14 after a processing time of 1 TU.

4) RS (Reference Signal) Structure

The RS structure for demodulating an uplink (or downlink) control signal or data can also be determined according to the number of transmitted TUs. In general, when a channel is transmitted, it is preferred to transmit RSs in two or more symbols. The reason for this is to improve reception performance. That is, respective channels are estimated from a plurality of RS symbols and then, a frequency error or channel variation that may occur between two symbols is grasped and compensated. Thereafter, channel estimation is performed on the remaining channels, thereby improving the reception performance.

Thus, even when a small number of TUs are used for transmission, multiple RS transmission symbols are required. On the other hand, when a number of TUs are used for transmission, the number of RS transmission symbols does not need to be proportional to the number of the TUs. That is, in this case, RS transmission symbols enough to estimate a channel variation are required only.

FIG. 13 illustrates an example in which RS overhead is changed depending on the number of TUs according to an embodiment of the present invention.

Referring to FIG. 13 (a), since a channel transmitted in TU #0 has two RS transmission symbols, the amount of overall RS overhead corresponds to two symbols per TU. In addition, since a channel transmitted in TU #4 to TU #7 also has two RS transmission symbols, the amount of overall RS overhead corresponds to 0.5 symbols per TU. In particular, such a RS structure is more suitable for an RS that can be used by only a specific UE, i.e., an RS that cannot be shared by all UEs. The RS may include a UE-dedicated RS that is precoded for a specific UE in downlink and an RS transmitted by each UE in uplink.

FIG. 13 (b) shows a structure similar to that of FIG. 13 (a). However, in FIG. 13 (b), when 4 TUs are used, RS density is increased compared to the FIG. 13 (a) to prevent a distance between RS symbols from being extremely increased. As a result, RS overhead is maintained as one symbol per TU.

Figure 14:
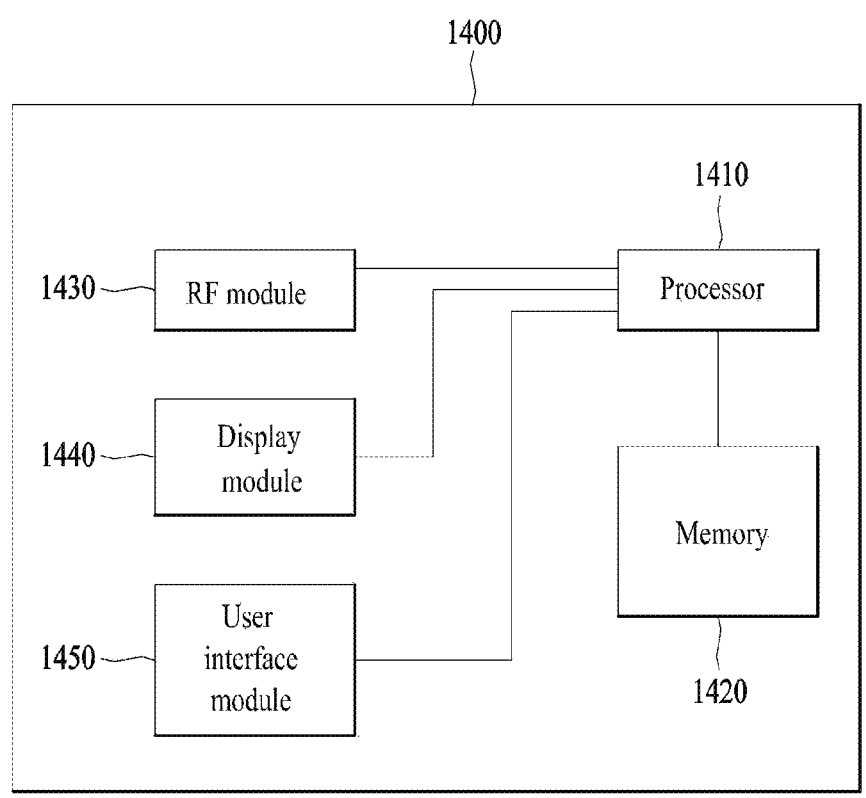
FIG. 14 is a block diagram of a communication apparatus according to an embodiment of the present invention.

FIG. 14 is a block diagram of a communication apparatus according to an embodiment of the present invention.

Referring to FIG. 14, a communication apparatus 1400 includes a processor 1410, a memory 1420, an RF module 1430, a display module 1440 and a user interface module 1450.

The communication apparatus 1400 is illustrated for convenience of description and some modules may be omitted. Furthermore, the communication apparatus 1400 may further include necessary modules. Some modules of the communication apparatus 1400 may be subdivided. The processor 1410 is configured to perform operations according to the embodiments of the present invention, described with reference to attached drawings. Refer to descriptions of FIGS. 1 to 13 for detailed operations of the processor 1410.

The memory 1420 is connected to the processor 1410 and stores an operating system, applications, program code, data, etc. The RF module 1430 is connected to the processor 1410 and converts baseband signals into RF signals or converts RF signals into baseband signals. To achieve this, the RF module 1430 performs analog conversion, amplification, filtering and frequency upconversion or reverse operations thereof. The display module 1440 is connected to the processor 1410 and displays various types of information. The display module 1440 may use a well-known element such as an LCD (Liquid Crystal Display), LED (Light Emitting Diode), OLED (Organic Light Emitting Diode) or the like. However, the display module 1440 is not limited thereto. The user interface module 1450 may be connected to the processor 1410 and configured in the form of a combination of well-known user interfaces such as a keypad, touchscreen and the like.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although a method for transmitting and receiving a downlink control channel in a wireless communication system and device therefor are mainly described with reference to examples applied to the 3GPP LTE system, the method and device can be applied to various wireless communication systems as well as the 3GPP LTE system.

What is claimed is:

1. A method for transmitting uplink channels to a base station (BS) by a user equipment (UE) in a wireless communication system, the method comprising:
   receiving, on a first subframe, a first uplink grant for transmitting, on a second subframe, a first transmission time interval (TTI) based uplink data channel;
   transmitting the first TTI based uplink data channel on the second subframe using the first uplink grant, if a second uplink grant for transmitting, on the second subframe, a second TTI based uplink data channel is not detected; and
   transmitting, on the second subframe, the second TTI based uplink data channel using the second uplink grant, if the second uplink grant is detected,
   wherein the second TTI is shorter than the first TTI.

2. The method of claim 1, wherein, if the second uplink grant is detected, the first TTI based uplink data channel is not transmitted on the second subframe.

3. The method of claim 1, wherein the second TTI is determined based on a latency required for the second TTI based uplink data channel.

4. The method of claim 1, wherein a time interval between a detection of the second uplink grant and a transmission of the second TTI based uplink data channel is determined based on the second TTI.

5. A user equipment (UE) in a wireless communication system, the UE comprising:
   a radio frequency (RF) unit; and
   a processor connected with the RF unit,
   wherein the processor is configured to:
   receive, on a first subframe, a first uplink grant for transmitting, on a second subframe, a first transmission time interval (TTI) based uplink data channel;
   transmit the first TTI based uplink data channel on the second subframe using the first uplink grant if a second uplink grant for transmitting, on the second subframe, a second TTI based uplink data channel is not detected; and
   transmit, on the second subframe, the second TTI based uplink data channel using the second uplink grant, if the second uplink grant is detected,
   wherein the second TTI is shorter than the first TTI.

6. The UE of claim 5, wherein, if the second uplink grant is detected, the first TTI based uplink data channel is not transmitted on the second subframe.

7. The UE of claim 5, wherein the second TTI is determined based on a latency required for the second TTI based uplink data channel.

8. The UE of claim 5, wherein a time interval between a detection of the second uplink grant and a transmission of the second TTI based uplink data channel is determined based on the second TTI.

\* \* \* \* \*